C. J. GUSTAFSON & R. W. ELLINGHAM.
HANDLE BAR CLAMP FOR MOTOR CYCLES.
APPLICATION FILED OCT. 27, 1913.
1,215,145.
Patented Feb. 6, 1917.
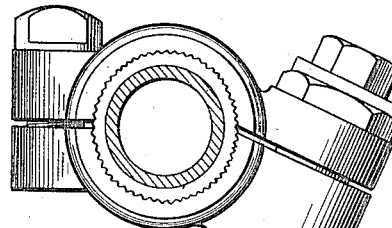
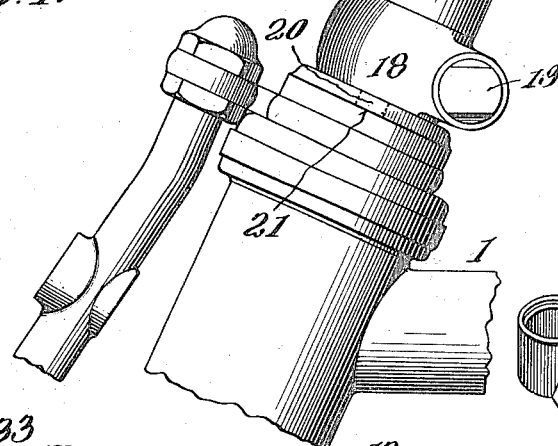
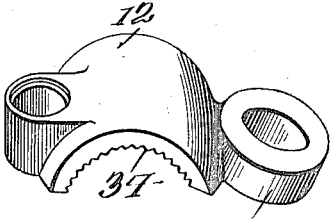
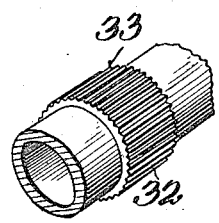
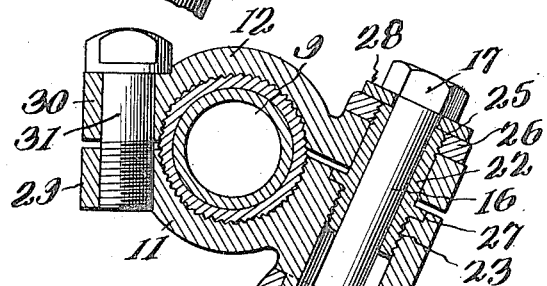
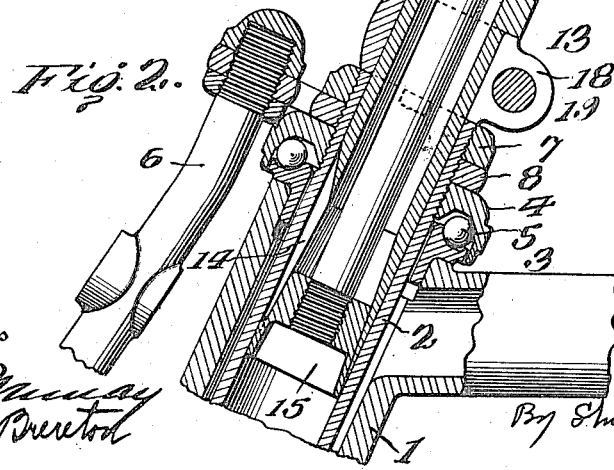

UNITED STATES PATENT OFFICE.

CARL J. GUSTAFSON AND ROBERT W. ELLINGHAM, OF SPRINGFIELD, MASSACHUSETTS, ASSIGNORS TO HENDEE MANUFACTURING COMPANY, OF SPRINGFIELD, MASSACHUSETTS, A CORPORATION OF MASSACHUSETTS.

HANDLE-BAR CLAMP FOR MOTOR-CYCLES.

1,215,145.     Specification of Letters Patent.     Patented Feb. 6, 1917.

Application filed October 27, 1913. Serial No. 797,605.

*To all whom it may concern:*

Be it known that we, CARL J. GUSTAFSON and ROBERT W. ELLINGHAM, a subject of the King of Sweden and a citizen of the United States, respectively, residing at Springfield, in the county of Hampden, State of Massachusetts, have invented certain new and useful Improvements in Handle-Bar Clamps for Motor-Cycles, of which the following is a description, reference being had to the accompanying drawing and to the figures of reference marked thereon.

The invention relates to new and useful improvements in handle bar clamps for motorcycles, and more particularly to clamps of the character wherein the handle bar is frictionally gripped by a clamping member which is connected to the steering stem in the head of the motorcycle.

An object of the invention is to provide a clamping means for the handle bar wherein pressure may be independently exerted upon the handle bar at opposite sides thereof so that the handle bar may be firmly gripped and prevented from turning in said clamping means.

A further object of the invention is to provide a clamping means of the above character wherein the clamping member at one side of the handle bar is so constructed as to surround the expanding bolt which secures the supporting sleeve for the handle bar to the steering stem.

A further object of the invention is to provide clamping means of the above character with auxiliary devices for securing the sleeve supporting the handle bar to the steering stem.

These and other objects will in part be obvious and will in part be hereinafter more fully disclosed.

In the drawings which show by way of illustration one embodiment of the invention:

Figure 1 is a detail view showing the clamping means for the handle bar in side elevation and the handle bar in section.

Fig. 2 is a vertical sectional view through the steering head, the clamping means and the handle bar.

Fig. 3 is a detail perspective view of the movable clamping member.

Fig. 4 is a detail in perspective showing a portion of the handle bar.

The invention consists, generally, in providing a clamping means for the handle bar which is formed in two separable parts, one of which is formed integral with a sleeve adapted to be clamped in the steering stem. The other part of the clamping means is entirely separate from the first fixed part and means is provided for exerting at opposite sides of the handle bar a clamping pressure which enables the handle bar to be firmly gripped between the two parts or members of the clamping means. The invention further consists in providing in addition to the expanded sleeve for locking or fastening the clamping means to the steering stem, an auxiliary securing means which aids in preventing said supporting sleeve for the clamping means from turning in the steering stem.

Referring more in detail to the drawings, the frame 1 of the motorcycle is of the usual construction and the front fork is mounted on the steering stem 2 which in turn is mounted in the head of the frame so as to rotate therein. A bearing 3 is mounted at the upper end of the head and a collar 4 clamped to the steering stem 2 rests on and incloses balls 5, which in turn are mounted on said bearing 3. A strengthening support 6 attached to the fork is also clamped to this steering stem by a threaded nut 7 which clamps an arm 8 attached to the support against the collar 4. These parts are of the usual construction and further description will not be necessary.

The handle bar 9 is firmly clamped in the clamping means therefor which consists of a lower clamping part or member 11 and an upper clamping part or member 12. As herein shown, a sleeve 13 is formed integral with the lower clamping member 11 and this sleeve extends into the steering stem 2 which is rigidly connected to the front fork. The lower end of the sleeve 13 is slotted, as at 14, and is also tapered so as to receive an expanding nut 15 threaded on to the expanding bolt 16. When the expanding bolt 16 is turned by the head 17 formed thereon, the expanding nut 15 will be drawn into the sleeve expanding the lower end thereof against the steering stem and frictionally lock the same together.

A split collar 18 also surrounds the sleeve 13 and is firmly clamped thereto by a bolt 19. This collar is formed with downwardly projecting lugs 20 on opposite sides thereof which are adapted to engage recesses 21 formed in the upper end of the steering stem 2. These interengaging recesses and lugs form an auxiliary locking means for holding the sleeve, which carries the handle bar, from turning in the steering stem. It will be noted that there are two distinct and independent locking devices for holding this sleeve which supports the handle bar from turning in the steering stem, the one being the expanding nut which forces the lower end of the sleeve against the inner wall of the steering stem, the other being the interengaging lugs and recesses on the steering stem and the collar which is firmly gripped to the sleeve carrying the handle bar.

As above noted the clamping member 11 is formed integral with the sleeve extending into and locking to the steering stem. A sleeve 22 is threaded into the opening formed through the clamping member 11, as at 23, and said sleeve projects above said clamping member and is adapted to receive a collar 24 formed integral with the clamping member 12. This collar slides freely on the sleeve 22. The extreme outer end of the sleeve is threaded, as at 25, and a nut 26 engages said threaded end and serves to clamp or force the collar 24 toward the lower clamping member. Said sleeve 22 is provided with a laterally projecting flange 27 which is formed with the usual socket to receive a spanner wrench. On the upper end the expanding bolt 16 projects through the sleeve 22 and the head 17 of said bolt rests against a washer 28 which in turn rests against the outer end of the sleeve 22. By this arrangement, the clamping member 12 may have a clamping pressure exerted thereon independently of the expanding bolt which coöperates with the expanding nut at the lower end thereof to frictionally hold the sleeve supporting the clamping means in the steering stem. In other words, the clamping device for the clamping member 12 is concentric to the expanding bolt but is independent thereof.

The lower clamping member 11 is provided with an outwardly projecting threaded ear 29 which is located substantially on the opposite side of the clamping member 11 from the sleeve 13. The upper clamping member 12 is provided with a projecting ear 30 which is also substantially on the opposite side of said clamping member from the collar 24. A bolt 31 extends through the perforated ear 30 and is threaded into the perforated ear 29. This bolt serves as a means for forcing the ear 30 toward the ear 29. As viewed in Fig. 2, it will be apparent that the projecting ears 29 and 30 are substantially horizontal, while the collar 24 is located in a plane substantially at right angles to the axis of the steering head.

The handle bar 9 is provided with a collar 32 which is preferably sweated thereon and the outer face of this collar is serrated, as at 33. The inner faces of the two clamping members 11 and 12 are also serrated or grooved transversely thereof, as at 34. The collar 33 is adapted to be engaged by the clamping members 11 and 12. By turning the bolt 31, a clamping pressure may be exerted at one side of the handle bar and by turning the nut 26, a clamping pressure may be exerted at the other side of the handle bar. It will, therefore, be seen that the clamping pressure of the member 12 toward the member 11 will be equally distributed not only at each side of the handle bar but throughout the entire extent where the said handle bar is gripped for the reason that the circular recesses formed in the clamping members may be shortened at each side of the handle bar. Furthermore, the above construction of clamping means allows one side of the clamping member to be turned down to a greater extent than the other and thereby secure a tightening or gripping radial contact with the handle bar.

While we have shown lugs formed on the collar 18, and recesses formed at the upper end of the steering stem, it will be obvious that the lugs may be formed on the stem and the recesses formed in the collar.

It will be obvious that minor changes in the details of construction and the arrangement of the parts may be made without departing from the spirit of the invention as set forth in the appended claims.

Having thus fully described our invention, what we claim is:

1. A handle bar clamp for motorcycles including a sleeve extending into the steering stem, devices for securing said sleeve to said stem, a clamping member formed integral with said sleeve and having a semi-circular recess for the handle bar, said clamping member having a horizontally projecting portion, a second clamping member having a semi-circular recess for the handle bar and having a horizontally projecting portion spaced from the horizontally projecting portion on the first clamping member, means for forcing said horizontally projecting portions toward each other, said second clamping member having a projecting portion on the opposite side of the handle bar from the first named projecting portion thereon which is disposed in a plane substantially at right angles to the steering stem, and clamping means concentric with the axis of the steering stem for engaging the last named projecting portion and forcing the second clamping member against the handle bar.

2. A handle bar clamp for motorcycles including a sleeve extending into the steering stem, devices for securing said sleeve to said stem, a clamping member formed integral with said sleeve and having a semi-circular recess for the handle bar, a horizontally projecting ear carried by said clamping member, a second clamping member having a semi-circular recess for the handle bar, and a horizontally projecting ear spaced from the ear on the lower clamping member, a threaded bolt for forcing said ears toward each other, a collar carried by said second clamping member on the opposite side of the handle bar from said ears, said collar being disposed in a plane substantially at right angles to the axis of the steering stem, a second sleeve threaded into the lower clamping member and adapted to extend through the collar on the upper clamping member, and a nut for engaging said last named sleeve and pressing against said collar for forcing the same toward the lower clamping member.

3. A handle bar clamp for motorcycles including a sleeve extending into the steering stem, means for securing said sleeve to said stem, a collar clamped on said sleeve and having projecting lugs adapted to engage recesses formed in the upper end of the steering stem, said sleeve having a clamping member formed integral therewith, which clamping member is provided with a recess for the handle bar, a second clamping member separate from the first clamping member and having a recess for the handle bar, and devices on opposite sides of the handle bar for securing the clamping members together.

In testimony whereof we affix our signatures in the presence of two witnesses.

CARL J. GUSTAFSON.
ROBERT W. ELLINGHAM.

Witnesses:
C. W. JAENEAN,
HARRY A. BROWN.

Copies of this patent may be obtained for five cents each, by addressing the "Commissioner of Patents, Washington, D. C."